United States Patent [19]

Adrian et al.

[11] Patent Number: 4,671,761
[45] Date of Patent: Jun. 9, 1987

[54] APPARATUS FOR PRODUCING REINFORCED ELONGATE BODIES

[75] Inventors: Rainer Adrian, Seevetal; Finn Kroksnes, Hamburg, both of Fed. Rep. of Germany

[73] Assignee: Fried. Krupp Gesellschaft mit beschrankter Haftung, Essen, Fed. Rep. of Germany

[21] Appl. No.: 750,881

[22] Filed: Jul. 1, 1985

[30] Foreign Application Priority Data

Jun. 30, 1984 [DE] Fed. Rep. of Germany ....... 3424269

[51] Int. Cl.[4] .............................................. B29B 7/84
[52] U.S. Cl. .................................... 425/501; 264/102; 264/174; 264/347; 264/349; 425/505; 425/508; 425/516; 425/114; 425/206; 425/376 B; 425/812
[58] Field of Search ............... 264/236, 347, 211, 174, 264/209.2, 102, 349; 425/114, 144, 467, 207, 376 B, 380, 381, 205-206, 113, 378 R, 73, 505, 501, 508, 516, 812

[56] References Cited

U.S. PATENT DOCUMENTS

| 3,800,019 | 3/1974 | Parsey et al. | 264/174 |
| 3,856,447 | 12/1974 | Schiesser | 425/380 |
| 3,869,235 | 3/1975 | Moore | 425/113 |
| 3,979,488 | 9/1976 | Greenhalgh et al. | 425/205 |
| 4,017,579 | 4/1977 | Roe et al. | 264/174 |
| 4,076,481 | 2/1978 | Sansone | 425/467 |
| 4,111,621 | 9/1978 | Otani | 264/174 |
| 4,302,409 | 11/1981 | Miller et al. | 264/211 |
| 4,304,537 | 12/1981 | Kirjavainen et al. | 264/174 |
| 4,365,946 | 12/1982 | Anders | 425/376 B |

FOREIGN PATENT DOCUMENTS

| 48819 | 4/1982 | European Pat. Off. | 264/349 |
| 52-60875 | 5/1977 | Japan | 264/236 |
| 53-19029 | 6/1978 | Japan | 264/236 |
| 59-101347 | 6/1984 | Japan | 264/236 |

Primary Examiner—Jeffery Thurlow
Attorney, Agent, or Firm—Karl F. Ross; Herbert Dubno

[57] ABSTRACT

A shear head in which an extruded vulcanizable composition meets preheated reinforcing strands has a compartment adjacent a mouth of the head which is evacuated to reduce the danger of gases affecting adhesion of the strands to the composition.

3 Claims, 3 Drawing Figures

APPARATUS FOR PRODUCING REINFORCED ELONGATE BODIES

FIELD OF THE INVENTION

Our present invention relates to an apparatus for producing reinforced elongate bodies and more particularly to an apparatus for producing profiles and tubes containing reinforcing strands and adapted to be subjected to subsequent vulcanization in a pressureless state.

BACKGROUND OF THE INVENTION

The term "profiles" as used herein is intended to refer to any cross sectional shape of extruded member containing reinforcement strands, fabric or cores. Profiles include tubes or pipe which can be reinforced by a collection of strands forming a braid or fabric.

It is known to extrude a cross-linked or cross-linkable composition and to feed the reinforcement to the extruded composition in an extrusion apparatus, the reinforcement strands being embedded in the extrusion.

The extrusion can then be vulcanized at ambient pressure. The rubber body which results can be a belt, hose, pipe or structural element.

In a conventional apparatus, due to the fact that the material has to be without pores, gas is initially extracted from the mixed components of the profiles in a degassing vacuum extruder and is then fed to the extruding head. The reinforcement of the profiles is injected continuously, via an appropriate opening from the outside, into the extruding head.

The components injected into the extruding head are combined there and leave it in the form of a finished profile not yet completely vulcanized. The production of reinforced tubes follows a similar procedure. The reinforcement strand of the tube corresponds to the reinforcement of profiles. The reinforcement strand is combined with the extruded mixture in the extruding head and leaves it uniformly coated and impregnated.

In a conventional shear head apparatus, immediately before the reinforcement is brought together with the mixture, the reinforcement comes into contact with surrounding air. As a result, air and gases of the preheated reinforcement strand are trapped in the final product and the adhesion between reinforcement strand of the tube and the cross-linkable rubber covering is reduced. This is the result of the warming of the trapped air in the extruding head and in the vulcanization apparatus with subsequent expansion of the air. Since the vulcanization can be effected without pressure, the trapped air cannot be pressed out, and in the final product, said trapped air represents a boundary layer between the reinforcement and the surrounding material. The decreased adhesion lowers the quality of the final product and in the case of reinforced tubes, it is virtually impossible to manufacture a top quality product.

OBJECTS OF THE INVENTION

It is, therefore, an object of the present invention to provide an apparatus which enables the manufacture of reinforced profiles or reinforced tubes without loss of quality due to trapped air in the final product.

Specifically, an object of the present invention is to eliminate problems relating to the adhesion between reinforcement strand of the tube and the outer layer of the tube, problems which are created during traditional pressureless vulcanization processes.

SUMMARY OF THE INVENTION

The present invention provides an apparatus used for the production of reinforced profiles and/or reinforced tubes made of cross-linked materials, which are vulcanized without exterior pressure, with a worm or screw, and independent of the worm or screw's speed of rotation and rate of flow, with a shearing-action-producing shear head and an extruding head, where the reinforcement strand of the tube is brought together with the sheared material.

More particularly, the area of the extruding head, in front of the point where the reinforcement strand of the tube is brought together with the sheared material, said sheared material flowing from the shear head, is connected to a vacuum pump which creates a vacuum in said area.

This object, is attained, therefore, in accordance with the present invention, with an apparatus used for the production of reinforced profiles and/or reinforced tubes made of cross-linked materials, which are vulcanized without exterior pressure, with a worm or screw, and independent of the worm or screw's speed of rotation and rate of flow, with a shearing-action-producing shear head and an extruding head, where the reinforcement strand of the tube is brought together with the sheared material. To avoid the enclosure of trapped air and volatile gas particles of a pre-heated reinforcement strand in the final product, the present invention provides that the area or chamber of the extruding head, in front of the point where the reinforcement strand of the tube is brought together with the sheared material, the sheared material flowing from the shear head, is connected with a vacuum pump which creates a vacuum in this area.

BRIEF DESCRIPTION OF THE DRAWING

The above and other features and advantages of the present invention will become more readily apparent from the following description, references being made to the accompanying drawing in which.

SPECIFIC DESCRIPTION

Figure 1:
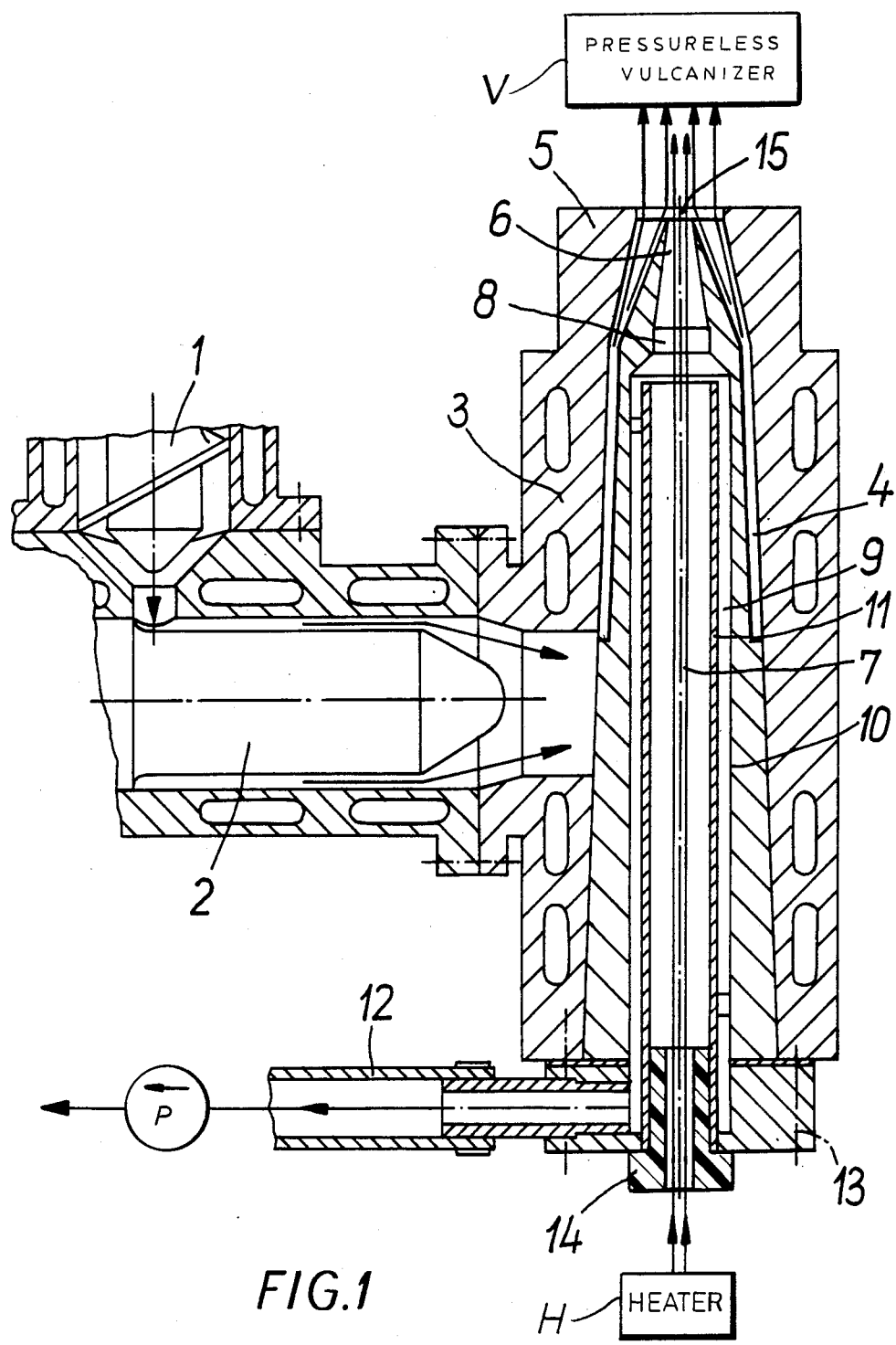
FIG. 1 is a longitudinal section of the apparatus of the invention.
Figure 2:
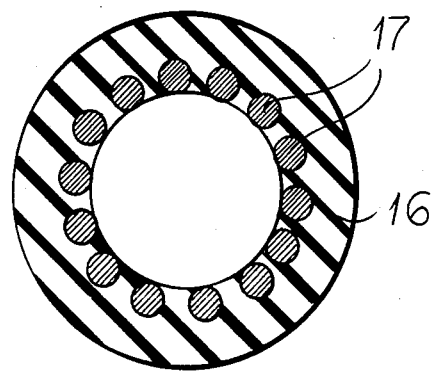
FIGS. 2 and 3 are transverse sections through products of the invention.
Figure 3:
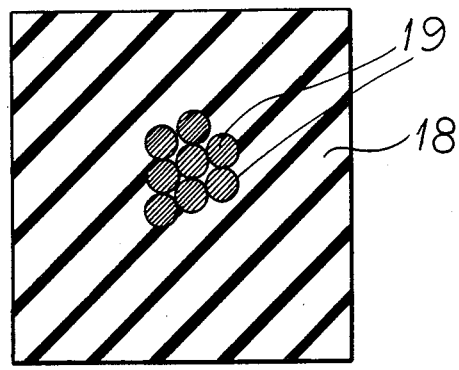

FIGS. 2 and 3 show a pipe and a bar fabricated using a head as shown in FIG. 1, each having reinforcement strands 17,19 embedded in the rubber composition 16,18 which can be vulcanized in ambient pressure after extrusion.

In the apparatus; worm or screw 1, shear head 2 and extruding head 3 comprise a single unit. Within the extruding head 3, there is an annular channel 4 extending to the mouth 15 of the head. Via the shear head 2 and the annular channel 4, the sheared material passes in the direction of the arrows to the shaping device 5 of the extruding head 3.

Thus, at point 6, in the shaping device 5 of the extruding head 3, the reinforcement strands 7 may be combined with the cross-linkable or vulcanizable material.

Section 8, located in front of section 6, a chamber which is connected with a vacuum pump P via passage 9, defined between the inner wall 10 of the extruding head 3 and a thin walled pipe 11 and communicating with a connecting duct 12.

Within the interior of the extruding head, the vacuum pump P creates a vacuum which in section 8 amounts to less than 0.35 bar. A vacuum is also created in the thin walled pipe 11 and kept in end section 13 of the extruding head 3; reinforcement stand 7, made of heat-resistant material is fed via packing sleeve 14 to extruding head 3.

The vacuum causes the effective removal of impurities, trapped air and other gas particles from the surface of reinforcement strand 7 at the compartment 8 just before the strands meet the rubber composition.

The distance between the packing sleeve 14 and the space 8 is significantly greater than the distance between space 8 and the point of discharge 15 of extruding head 3. The material supplied to shear head 2 will be kept at a temperature which is only a few degrees Kelvin below the scorch point. The extrusion is vulcanized at V and the reinforcement strands are preheated at H.

We claim:

1. An apparatus for continuously producing a reinforced body which comprises:
    a rotary worm extruder displacing a vulcanizable composition;
    a shear head comprising a narrow annular passage defined around a central body connected to said extruder for intensively shearing said vulcanizable composition at a rate independent of the speed of said rotary worm extruder;
    means defining a further annular passage traversed by said vulcanizable composition and connecting said shear head with a mouth from which said reinforced body emerges;
    a channel defined in said means for delivering at least one reinforcing strand to said mouth for incorporation in said vulcanizable composition and in said reinforced body;
    a vacuum pump;
    means for connecting a region of said channel upstream of a location at which said reinforcing strand meets said vulcanizable composition and directly adjacent said mouth with said vacuum pump to generate suction in said region, thereby preventing inclusion of air at interfaces of said vulcanizable composition with said reinforcing strand, said channel being formed by a thin-wall tube defining an annular gap over substantially the entire length of said tube with a housing formed with said further annular passage; and
    a heat-resistant synthetic resin sleeve received in said tube at an inlet end thereof remote from said region and at which said strand enters said tube, said strand passing through said sleeve, the spacing between said sleeve and said region being substantially greater than the spacing between said region and said mouth.

2. The apparatus defined in claim 1 wherein said vacuum pump is constructed and arranged to generate a pressure of less than 0.35 bar at said region.

3. The apparatus defined in claim 1 wherein said means defining said further passage is constructed and arranged so that said vulcanizable composition is maintained at a temperature only several degrees below the scorch temperature of said vulcanizable composition as it passes along said further passage.

* * * * *